Figure 1:
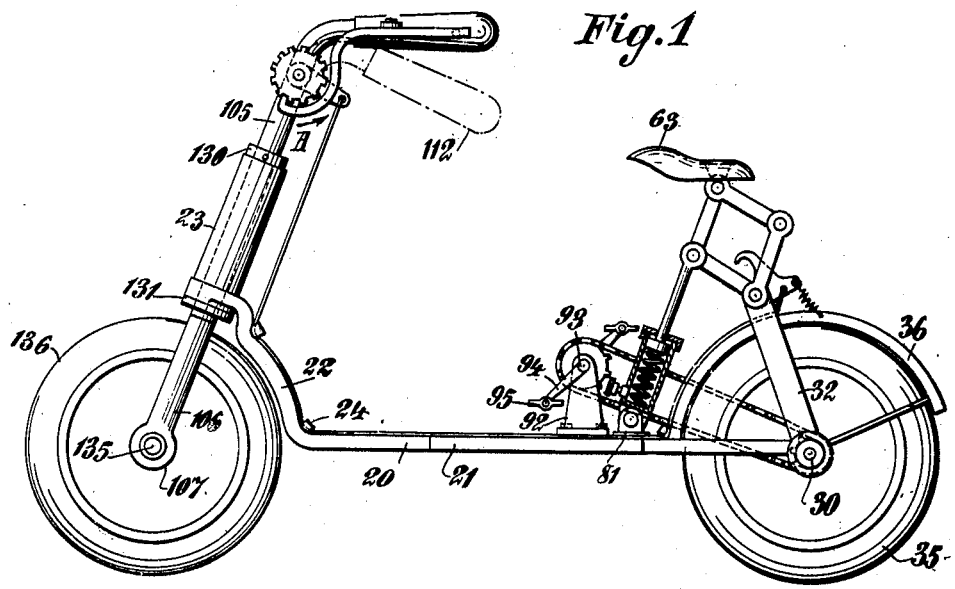

Aug. 16, 1932.  J. HOLTZMAN  1,872,142
COMBINED BICYCLE AND SCOOTER
Original Filed Jan. 9, 1922

Inventor:
John Holtzman

Patented Aug. 16, 1932

1,872,142

UNITED STATES PATENT OFFICE

JOHN HOLTZMAN, OF NEW YORK, N. Y.

COMBINED BICYCLE AND SCOOTER

Original application filed January 9, 1922. Serial No. 528,005. Divided and this application filed July 7, 1926. Serial No. 120,887.

This invention relates to a combined bicycle and scooter and is a division of my application for motor cycle, filed Jan. 9, 1922, Serial No. 528,005.

The object of the invention is the production of a vehicle, which can be used either as a bicycle or a scooter. Bicycles have heretofore been produced with a pair of aligned wheels spaced comparatively close together, whereby the frame supporting the wheels, the seat and the steering handle obstructs the space between the wheels in such a way that the rider cannot mount the vehicle by positioning himself in said space. I provide in my improved bicycle, a clear, unobstructed space between the wheels; first, by making the wheels of comparatively small diameter, thereby giving more room between them without substantially lengthening the vehicle; second, by providing a low, substantially horizontal frame between the wheels; third, by supporting the rider's seat, by suitable mechanism connected to the rear part of the frame and to the rear axle, and at a substantial height above the rear wheel and fourth, by placing the pedomotive means or foot pedals on the horizontal frame and comparatively close to the rear axle. Various advantages arise from this construction, such as the location of the center of gravity of the vehicle close to the ground enabling easy balancing, the possibility of easy mounting of the vehicle, its adaptability for use as a scooter when it is not desired to operate the pedals and other advantages which will appear as the description progresses and from the drawing.

Figure 2:
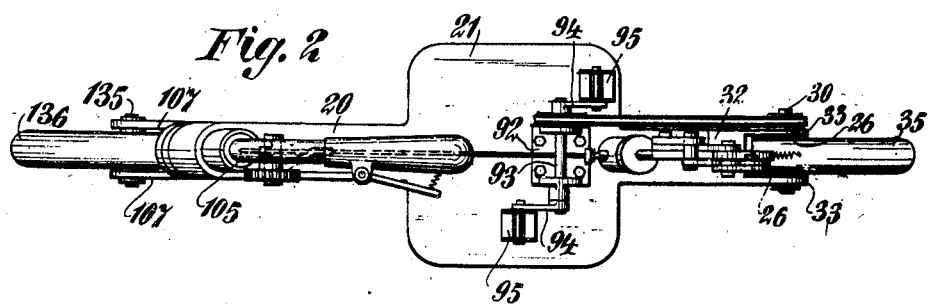

In the accompanying drawing Fig. 1 represents a side elevation of an exemplification of the combined bicycle and scooter and Fig. 2 shows a top plan view of Fig. 1.

A frame 20 has formed therewith at about its middle portion, a platform as 21, though it will be understood that the platform may be omitted if desired. At the front end of the frame 20 is formed the arm 22 which engages the sleeve 23, in which sleeve is rotatably supported, the steering post 105. Said post has formed therewith a bifurcated lower end 106 terminating in the journal bearings 107. The collars 130 and 131 on said post serve to maintain the steering post in proper operative position on the sleeve 23. The rear end of the said frame has formed therewith the bifurcated end having the members 26, which are hinged on the rear axle 30. A seat-supporting bracket 32 is indicated with the bifurcated lower portion having the members 33 preferably supported by the rear axle 30. A rear wheel 35 is rotatably mounted on the rear axle 30 in the usual manner. A guard 36 for the rear wheel 35 extends from the frame 20.

At the upper end of the bracket 32 is provided suitable mechanism for adjustably supporting the seat 63. Said mechanism forms no part of the present application and hence need not be described in detail. In view of the small diameter of the wheels of my improved vehicle as compared with those of the bicycles heretofore used, the said seat 63 is preferably arranged a distance above the rear wheel 35 approximately equal or greater than the radius of said wheel. Further, in order to provide a clear space of sufficient extent between the wheels, said wheels are preferably spaced apart a distance greater than the diameter of either wheel. The front wheel 136 is mounted on a suitable axle 135, which is journalled in the bearings 107 in the usual manner.

A journal bracket 81 is supported upon and preferably fastened to the platform 21, and is operatively connected to the seat 63 by means which need not be here described in detail, but which acts as a cushioning strut for transmitting part of the weight of the rider to the frame 20.

A journal bracket 92 is supported upon and preferably fastened to the platform 21. A shaft 93 is journalled to the journal bracket 92 and has fastened thereto one end each of the crank arms 94, and to the latter are pivoted the foot pedals 95. For operating the vehicle by foot power, the usual sprocket wheels connected in the usual manner by a sprocket chain are provided on the shaft 93 and the rear axle 30.

In case the user desires to start the cycle when seated on the seat 63, he locates his feet on the foot pedals 95 and through the intervening connections, turns the rear wheels 35.

Various modifications may be made in the invention and the present exemplification is to be taken as illustrative and not limitative thereof.

I claim:

1. In a vehicle of the character described wherein the balance is wholly maintained by the rider, the combination of a frame having a platform, a rear wheel journaled in the frame, a front wheel journaled in the vehicle, pedal propelling means to drive one of said wheels including a sprocket wheel, pedals and a chain, a seat in the vehicle, means connecting the seat and frame and forming a support for the same, the major portions of the space above and the space at both sides of said platform being free and unobstructed to enable the rider to drive the vehicle in standing or sitting position at will.

2. A bicycle having a front wheel and a rear wheel normally in alignment with each other, a step between said wheels and having provision for receiving a rider's foot in the common vertical plane of said wheels, a seat, and pedal-operated mechanism connected to one of said wheels, said seat being mounted on said bicycle in position for operation of said mechanism by a rider seated thereon, the space above and at both sides of said step being free and unobstructed.

3. A bicycle having a front wheel and a rear wheel normally in alignment with each other, a step between said wheels for receiving a rider's foot in the common vertical plane of said wheels, a seat mounted in alignment with said wheels, and a handle bar connected to said front wheel and being operable either from said seat or from said step, the space above and at both sides of said step being free and unobstructed.

4. In a vehicle of the character described, wherein the balance is wholly maintained by the rider, the combination of a frame, a rear wheel journalled in the frame, a front wheel journalled in the vehicle and normally in alignment with said rear wheel, a platform formed with the frame for a rider to stand upon, a seat above the platform, a seat supporting element interposed between the platform and the seat, and revoluble propelling means associated with the platform to propel said rear wheel including a sprocket wheel and pedals arranged with the centers of rotation thereof above the platform, the major portions of the space above and the space at both sides of said platform being free and unobstructed to enable the rider to drive the vehicle in standing or sitting position at will.

5. In a vehicle of the character described wherein the balance is wholly maintained by the rider, the combination of a frame having a platform extending beyond the sides of the frame, a single small rear wheel supported by the frame, a single small front wheel, pedomotive means for driving one of said wheels including a sprocket and pedal device, and a shaft, and a standard on said platform for supporting said device for rotation above the platform, a seat, and means on the frame for supporting said seat, the major portions of the space above and the space at both sides of said platform being free and unobstructed to enable the rider to drive the vehicle in standing or sitting position at will.

In testimony whereof I have signed my name to this specification.

JOHN HOLTZMAN.